May 18, 1954     J. A. CHYBA     2,678,663

DIAPHRAGM ANCHORING MEANS AND SEALING GASKET THEREFOR

Original Filed March 3, 1948

INVENTOR
JOSEPH A. CHYBA

BY

HIS ATTORNEY

Patented May 18, 1954

2,678,663

UNITED STATES PATENT OFFICE 2,678,663

DIAPHRAGM ANCHORING MEANS AND SEALING GASKET THEREFOR

Joseph A. Chyba, Baltimore, Md., assignor to Hydro-Form Corporation, Baltimore, Md., a corporation of Maryland Original application March 3, 1948, Serial No. 12,871, now Patent No. 2,550,672, dated May 1, 1951. Divided and this application April 12, 1951, Serial No. 220,696

4 Claims. (Cl. 137—791)

This invention relates to a diaphragm anchoring means, and has for one of its objects the production of a simple and efficient means for anchoring a flexible diaphragm in place within a shape forming device, so as to secure the diaphragm against accidental displacement.

A further object of this invention is the production of a simple and efficient sealing gasket for use with a flexible diaphragm to hold the gasket in sealed and anchored engagement within a shape forming device.

Other objects and advantages of the present invention will appear throughout the following specification and claims.

This application is a divisional application of my application Serial Number 12,871, filed March 3, 1948, now U. S. Patent No. 2,550,672, and relating to a diaphragm anchoring means.

Figure 1:
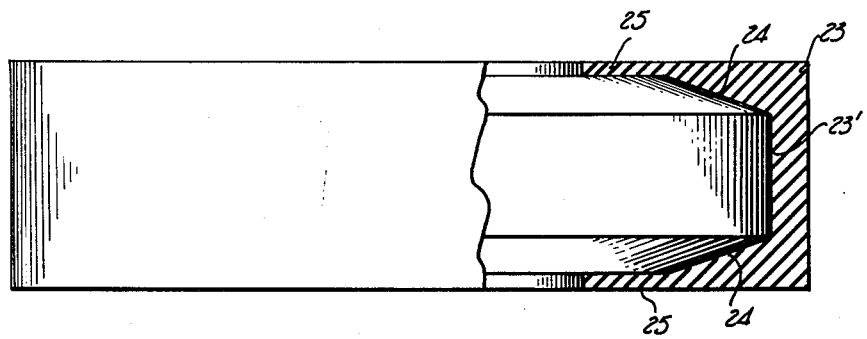
Figure 1 is a side elevational view of the sealing gasket, a portion thereof being shown in section.
Figure 2:
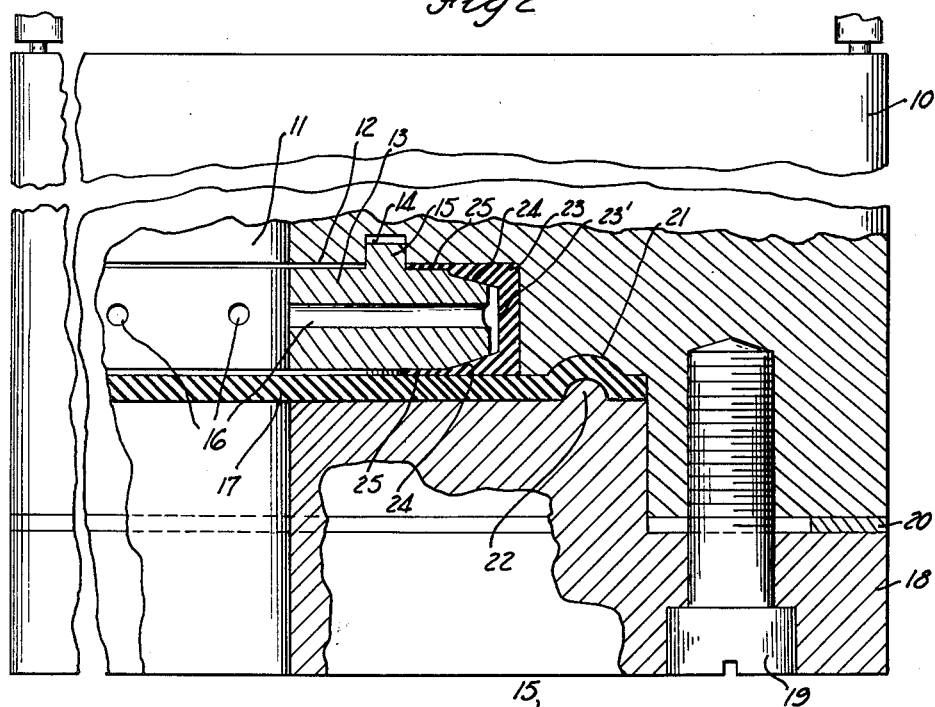
Figure 2 is a vertical sectional view of a shape forming device showing the diaphragm anchoring gasket in position, a portion of the shape forming device being shown in side elevation.
Figure 3:
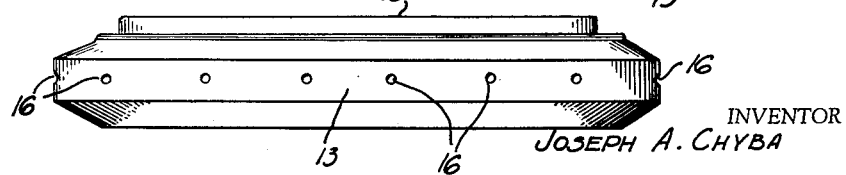
Figure 3 is a side elevational view of the diaphragm retaining ring.

By referring to the drawing, it will be seen that 10 designates the dome of the shape forming device which is provided with a pressure compartment 11. The dome 10 is provided with a recess 12 into which fits a removable diaphragm retaining ring or filler member 13. The upper wall of the recess 12 is provided with an annular channel 14, for receiving the annular tongue 15 which is carried by the upper face of the ring 13. This ring 13 is provided with radiating pressure ports 16 extending from the inner and through the outer face or periphery of the ring 13, as shown in Figure 2. As shown in Figure 2, the diaphragm 17, preferably formed of rubber, closes the lower end of the pressure compartment 11.

A lower retaining ring 18 is clamped upon the bottom of the dome 10 by means of bolts such as the bolt 19, shown in Figure 2, and a spacer 20 is preferably interposed between the abutting faces of the dome 10 and the retaining ring 18. The dome 10 is provided with a suitable bead receiving channel 21, which is located in opposed relation to the bead 22 carried by the upper face of the lower diaphragm retaining ring 18. The ring 18 is clamped in position by bolts such as the bolt 19 above described. The bead 22 forces the adjacent portion of the diaphragm 17 into the channel 21 when the bolts are tightened into position, in the manner shown in Figure 2, to provide a tongue-and-groove lock to anchor the diaphragm 17 in place.

A sealing gasket 23, preferably formed of rubber, having an outer abutment wall 23' and tapering inwardly extending flanges 24 terminating in substantially parallel lips 25 and defining a filler or spacer ring receiving channel, fits within the recess 12 and engages the upper face of the diaphragm 17. The spacer ring 13 fits in the recess 12 and between the lips 25 and into gasket 23, as shown in Figure 2. The spacer ring 13 is provided with ports 16, as stated above, and these ports 16 provide communication between the pressure compartment 11, and the gasket 23, in a manner whereby the pressure from the compartment 11 will force the gasket tightly against the walls of the recess 12 and in sealing contact with the diaphragm 17. The spacer 20 is of a developed or pre-computed thickness to control pressure on the diaphragm 17 as the ring 18 is clamped against the dome 10 and the diaphragm 17.

The spacer ring 13 is also of a pre-computed thickness so as to compress the lips 25 a definite amount to efficiently seal these lips 25 against the top wall of the recess 12 and the top face of the diaphragm 17. These lips 25 when so compressed will prevent any leakage of liquid at the time of each cycle of operation. When no pressure is present, the seal becomes relaxed. This spacer ring 13 retains just the amount of pressure to hold the lips 25 in a proper position, one against the dome 10, and the other against the diaphragm and to thereby prevent leakage of liquid.

Having described the invention, what is claimed as new is:

1. A device of the class described comprising a plurality of opposed diaphragm gripping members, one of the members having a pressure compartment, a flexible diaphragm interposed between the gripping members, means for securing the gripping members together, one of the members having a recess, a compressible gasket fitted in said recess and snugly engaging the diaphragm at a point between the members, said gasket having a filler member receiving portion, a filler member fitted in said filler member receiving portion of said gasket, and said filler member having ports communicating with said pressure compartment and the filler member receiving portion of said gasket to compress and seal said gasket and diaphragm respectively against abutting parts of said members.

2. A device of the class described comprising a plurality of opposed diaphragm gripping members, one of the members having a pressure compartment, a flexible diaphragm interposed between the gripping members, said gripping members having opposed faces contacting the diaphragm, one face having a bead and the other face having a channel to provide an interfitting gripping action relative to the diaphragm, means for securing the gripping members together, one of the members having a recess, a gasket fitted in said recess and snugly engaging the diaphragm at a point between said members, said gasket having a filler member receiving channel a filler member fitted in said channel of said gasket, and said filler member having ports communicating with said channel and pressure chamber for exerting pressure against said gasket to seal said gasket with respect to said diaphragm.

3. A device of the class described comprising a plurality of opposed diaphragm gripping members, one of the members having a pressure compartment, a flexible diaphragm interposed between the gripping members, said gripping members having opposed faces contacting the diaphragm, one face having a bead and the other face having a channel to provide an interfitting gripping action relative to the diaphragm, means for securing the gripping members together, one of the members having a recess, a gasket fitted in said recess and snugly engaging the diaphragm at a point between said members, said gasket having a spacer ring receiving channel a spacer ring fitted in the channel of said gasket, said spacer ring having ports communicating with said channel and pressure chamber for exercising pressure against said gasket to seal said gasket with respect to said diaphragm, said gasket having inwardly extending opposed tapering flanges extending in the direction of said ports and terminating in spaced inwardly extending compressible lips, and said spacer ring being interposed between said lips for forcing the lips into contact with one of the gripping members and the diaphragm respectively to provide a leak-proof seal.

4. A device of the class described comprising a plurality of opposed diaphragm-gripping members, one of the members having a pressure compartment, a flexible diaphragm interposed between the gripping members, said gripping members having opposed faces contacting the diaphragm, one face having a bead and the other face having a channel to provide an interfitting gripping action relative to the diaphragm, means for securing the gripping members together, one of the members having a recess, a gasket fitted in said recess and snugly engaging the diaphragm at a point between said members, said gasket having a spacer ring receiving channel a spacer ring fitted in the channel of said gasket, said spacer ring having ports communicating with said channel and pressure chamber for exercising pressure against said gasket to seal said gasket with respect to said diaphragm, said gasket having inwardly extending opposed tapering flanges extending in the direction of said ports and terminating in spaced inwardly extending compressible lips, said spacer ring being interposed between said lips for forcing the lips into contact with one of the gripping members and the diaphragm respectively to provide a leak-proof seal, and a spacer of developed thickness interposed between the gripping members to control clamping pressure on said diaphragm and the lips of said gasket.

References Cited in the file of this patent

UNITED STATES PATENTS

| Number | Name | Date |
|---|---|---|
| 116,669 | Blake | July 4, 1871 |
| 1,904,250 | Purvis | Apr. 18, 1933 |
| 2,100,462 | Wellman | Nov. 30, 1937 |
| 2,204,507 | Martin | June 11, 1940 |
| 2,229,057 | Dick | Jan. 21, 1941 |
| 2,446,694 | Dickson | Aug. 10, 1948 |
| 2,550,672 | Chyba | May 1, 1951 |